UNITED STATES PATENT OFFICE.

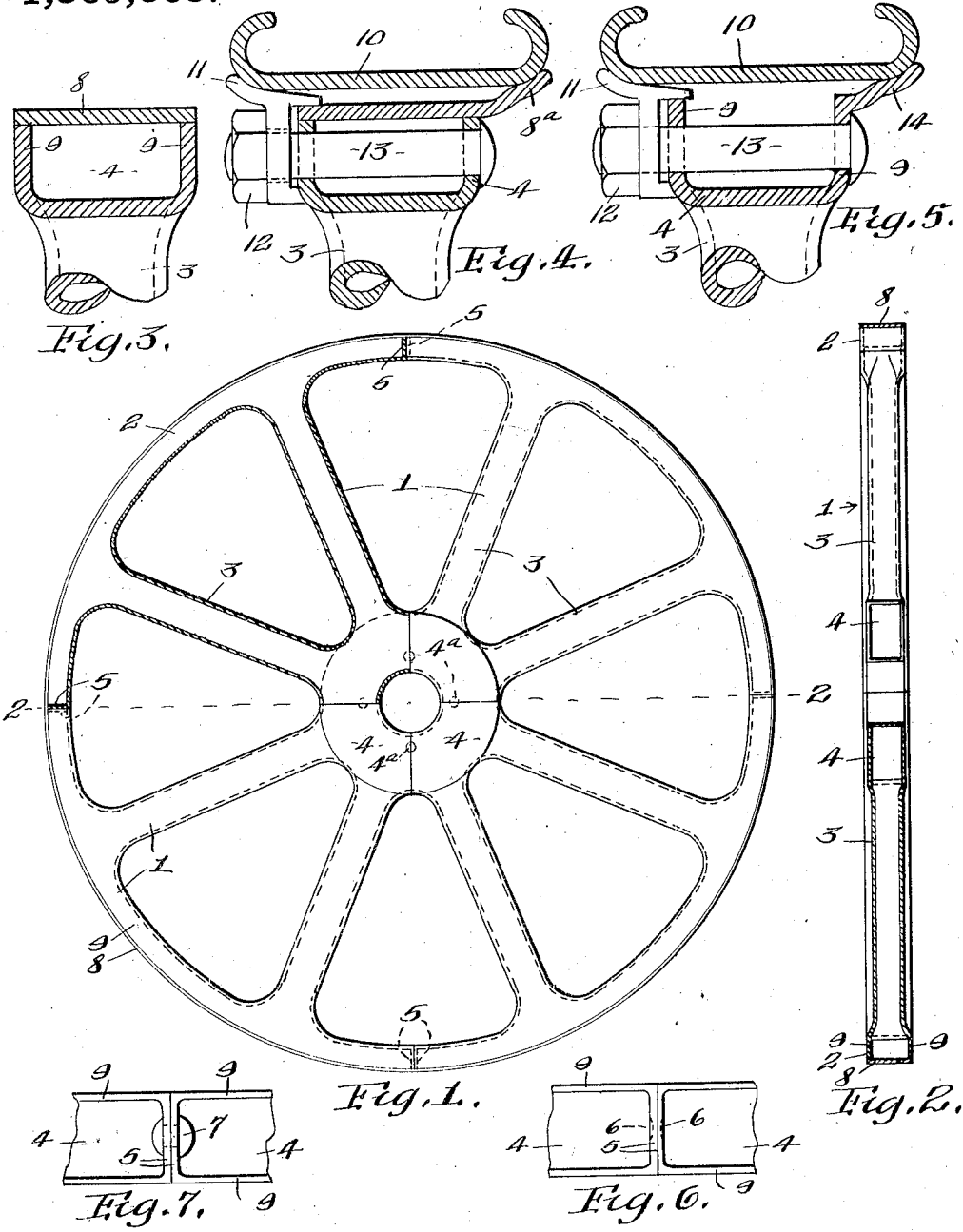

JEWELL W. VANDERVEER, OF SYRACUSE, NEW YORK.

SECTIONAL HOLLOW CAST-METAL SPOKE-WHEEL.

1,369,36                    Specification of Letters Patent.    Patented Feb. 22, 1921.

Application filed August 27, 1919. Serial No. 320,216.

*To all whom it may concern:*

Be it known that I, JEWELL W. VANDERVEER, a citizen of the United States, and a resident of Syracuse, in the county of Onondaga and State of New York, have invented a certain new and useful Sectional Hollow Cast-Metal Spoke-Wheel, of which the following is a specification.

This invention relates to hollow cast metal wheels and has for its object a hollow cast wheel composed of segments as quadrants which is economical in manufacture, comparatively light in weight and highly efficient and durable in use.

In describing this invention, reference is had to the accompanying drawings in which like characters designate corresponding parts in all the views.

Figure 1 is a side elevation, partly in section, of one embodiment of my wheel.

Fig. 2 is a sectional view on line 2—2, Fig. 1.

Fig. 3 is an enlarged transverse sectional view through the felly of the wheel.

Fig. 4 is a fragmentary transverse sectional view of the wheel showing a demountable rim thereon and associated parts.

Fig. 5 is a view similar to Fig. 4 of a modified form of the demountable rim feature.

Figs. 6 and 7 are fragmentary plan views of different forms of joints between the abutting ends of the felly sections.

This wheel comprises generally, a plurality of hollow segments 1, of a wheel, the planes of division between the segments extending in a general direction transversely of the wheel or in a general direction lengthwise of the axis of the wheel, and each segment includes a felly section 2, one or more hollow spokes 3 and a hollow hub section 4, the ends of adjacent felly sections, abutting against each other and being secured together and adjacent hub sections abutting against each other and being secured together.

Preferably, these segments 1 are quadrants, the planes of division between which are radial to the axis of the wheel, and the felly sections are in the form of a channel in cross section as shown in Figs. 3, 4 and 5. The ends of the felly segments are usually provided with transverse flanges 5 which abut or lie flatwise against each other and are secured together either by welding as at 6 as shown in Fig. 6, or by fastening means as a rivet 7 as shown in Fig. 7.

The hub sections are secured together at their abutting ends by spot welding as shown at 4ª.

Preferably, the felly sections 2 are formed with an open periphery, and a felly band 8 is pressed on the felly and engages the peripheral edges of the sides 9 of the channel of the felly and assists in holding the segments together, this band being what is usually termed a "press on" rim or band for the purpose of carrying demountable rims. This band is shown in Fig. 4 as formed with outwardly extending flanges or lugs 8ª on one side thereof as shown in Fig. 4 on which the demountable tire rim 10 rests. Said rim 10 is held in position by the usual wedges or lugs 11 which are held in position by nuts 12 screwing on a bolt 13 extending transversely through the felly.

In Fig. 5, the press on band 8 is shown as omitted and the demountable rim 10 rests on one side upon lugs or flanges 14 cast integral with one of the sides 9 of the channel of the felly sections, the wheel in this case being also provided with the wedges 11 and nut and bolt 12, 13.

This wheel is particularly advantageous in that the casting thereof does not involve complicated molds, cores or the high degree of skill or care required in casting one piece cast hollow wheels, and hence the percentage of defective castings is extremely low. And, further, when the parts are assembled the wheel is practically a unit and as the abutting faces are small very little grinding and facing is required as in wheels composed of sections divided into two circular sections along a plane extending at a right angle to the axis.

Further, the wheel can be made of light weight. In fact, my wheel when made up in the usual sizes now used on pleasure cars including Ford cars weighs less than the usual wheel equipment now on these cars and will stand a considerably greater strain.

It is particularly adapted for light trucks as one and two-ton trucks as it provides ample strength to support the load and is extremely light compared with the wheels now used on such trucks.

In making my wheel, the segments are cast and the abutting ends of the felly sections and the hub sections ground true and the sections abutted together and usually spot welded. The felly band is then pressed on.

What I claim is:

1. A hollow cast metal spoke wheel composed of segments, the planes of division between which extend in a general direction lengthwise of the axis of the wheel, each segment including a hollow felly section, a hollow spoke, and a hollow hub section, the felly sections being formed with transverse walls at their ends and the walls of adjacent sections lying against each other and being secured together, substantially as and for the purpose specified.

2. A hollow cast metal spoke wheel composed of segments separated along planes extending in general directions radial to the axis of the wheel and each segment including a felly section, a hollow spoke and a hollow hub section, the felly sections and the hub sections of adjacent segments abutting against each other and being secured together at their abutting faces, substantially as and for the purpose set forth.

3. A hollow cast metal spoke wheel composed of segments separated along planes radial to the axis of the wheel and each having a felly section, a hollow spoke and a hollow hub section, the felly sections being in the form of channels in cross section and formed with transverse walls at their ends extending across the channels, the flanges of adjacent sections abutting against each other, said flanges being secured together and the hub sections being secured at their abutting edges, substantially as and for the purpose described.

4. A hollow cast metal spoke wheel composed of segments, each segment including a felly section and a hollow spoke and a hollow hub section, the ends of adjacent felly sections having surfaces abutting against each other and the ends of adjacent hub sections having surfaces abutting against each other, the felly being secured together at such abutting faces, substantially as and for the purpose described.

In testimony whereof, I have hereunto signed my name, at Syracuse, in the county of Onondaga, and State of New York this 19 day of June, 1919.

JEWELL W. VANDERVEER.